United States Patent
Kim

(10) Patent No.: US 8,508,815 B2
(45) Date of Patent: Aug. 13, 2013

(54) SCANNER

(75) Inventor: Hyoung Il Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 873 days.

(21) Appl. No.: 12/625,132

(22) Filed: Nov. 24, 2009

(65) Prior Publication Data

US 2010/0149605 A1     Jun. 17, 2010

(30) Foreign Application Priority Data

Dec. 15, 2008   (KR) .................. 10-2008-0126990

(51) Int. Cl.
 *H04N 1/04* (2006.01)
 *G05B 19/40* (2006.01)
 *H02P 8/00* (2006.01)

(52) U.S. Cl.
 USPC ........... 358/497; 358/474; 358/471; 358/400; 358/486; 318/685; 318/696

(58) Field of Classification Search
 USPC ............. 358/497, 471, 474, 400, 486; 318/5, 318/9, 685, 696; 250/234–236; 399/211, 399/212
 See application file for complete search history.

(56) References Cited

U.S. PATENT DOCUMENTS

| | | | |
|---|---|---|---|
| 5,933,222 A * | 8/1999 | Hoshino et al. | 355/75 |
| 6,271,912 B1 * | 8/2001 | Kurosawa et al. | 355/75 |
| 6,525,503 B2 * | 2/2003 | Fang | 318/637 |
| 6,756,749 B2 * | 6/2004 | Haas et al. | 318/34 |
| 6,948,871 B1 * | 9/2005 | Onishi et al. | 400/679 |
| 6,984,956 B2 * | 1/2006 | Kang et al. | 318/685 |
| 7,123,386 B2 * | 10/2006 | Tanaka et al. | 358/474 |
| 7,477,425 B2 * | 1/2009 | Haas et al. | 358/474 |
| 7,534,183 B2 * | 5/2009 | Hung | 475/5 |
| 2002/0003207 A1 * | 1/2002 | Fang | 250/234 |

FOREIGN PATENT DOCUMENTS

JP   2007-199184   8/2007

OTHER PUBLICATIONS

English language abstract of JP 2007-199184, published Aug. 9, 2007.
Machine English language translation of JP 2007-199184, published Aug. 9, 2007.

* cited by examiner

*Primary Examiner* — Cheukfan Lee
(74) *Attorney, Agent, or Firm* — Staas & Halsey LLP

(57) ABSTRACT

A scanner with a first driving motor and a second driving motor has an improved driving structure as transmission of a driving force from one of the first and the second driving motors to the other driving motor is inhibited, thereby preventing loss of power and increased noise and vibration. The scanner may include a first driving motor, a second driving motor, an operating unit operable to move the scanning unit and configured to operate by a driving force generated from one of the first and the second driving motors and a power transmitting unit configured to transmit the driving force generated from one of the first and the second driving motors to the operating unit while disallowing transmission of the driving force between the first and the second driving motors.

17 Claims, 11 Drawing Sheets

SCANNER

CROSS-REFERENCE TO RELATED APPLICATION

This application claims the benefit of Korean Patent Application No. 2008-0126990, filed on Dec. 15, 2008 in the Korean Intellectual Property Office, the disclosure of which is incorporated herein by reference in its entirety.

TECHNICAL FIELD

The present disclosure relates to a scanner with an improved driving structure.

BACKGROUND

Generally speaking, a scanner is a device configured to read image data recorded on a document, and may be employed in various apparatuses, such as, for example, a facsimile, a digital photocopier, a multifunctional apparatus, and the like.

A conventional scanner may include a step motor and a DC motor mechanically connected with the step motor. During operation of the conventional scanner, only one of the step motor and the DC motor is driven at a given time. Thus, the conventional scanner selectively drives the step motor or the DC motor in consideration of the demanded resolution, the desired scanning speed, and the like.

However, in such a conventional scanner wherein the step motor and the DC motor are in mechanical connection with each other, a driving force of one of the step motor and the DC motor is transmitted to the other one not in operation, thereby incurring loss of power and increased noise and vibration. For example, when the step motor is driven, the DC motor mechanically connected with the step motor may operate as a load to the step motor. Also, as a rotor of the DC motor is rotated by the driving force transmitted from the step motor, noise and vibration may be generated. Moreover, structural load variation, such as a cogging torque, may be generated in the DC motor according to the position of the rotor. The cogging torque may vary the loads to the step motor, possibly deteriorating the scanning performance. An analogous problem may also occur during driving of the DC motor. Thus, a scanner with an improved driving structure is desired.

SUMMARY OF DISCLOSURE

In accordance with an aspect of the present disclosure, an apparatus for driving a movement of an image scanner may be provided to comprise a first motor, a second motor, an operating unit and a power transmitting unit. The first motor may be configured to generate a first driving force. The second motor configured to generate a second driving force. The operating unit may be configured to receive a driving force and to be operably coupled to the image scanner so as to cause the movement of the image scanner in response to the received driving force. The power transmitting unit may be configured to transmit the driving force to the operating unit while preventing transmission of the driving force between the first and second motors. The driving force may be a select one of the first driving force received from the first motor and the second driving force received from second motor.

The first motor may comprise a DC motor. The second motor may comprise a step motor.

The power transmitting unit may comprise at least one swing gear each configured to selectively couple the operating unit to a respective corresponding one of at least one of the first motor and the second motor.

The at least one swing gear may comprise a first swing gear configured to selectively couple the first motor to the operating unit and a second swing gear configured to selectively couple the second motor to the operating unit.

The power transmitting unit may comprises at least one electro-magnetic clutch each configured to selectively couple the operating unit to a respective corresponding one of the first and second motors. Transmission of the driving force may be selectively allowed according to on and off states of the at least one electro-magnetic clutch.

The electro-magnetic clutch may comprise a rotor comprising a coil, an armature mounted to face the rotor, a hub connected with the armature and a leaf spring having one end thereof fixed to the hub and the other end thereof fixed to the armature. The leaf spring may be configured to elastically bias the armature away from the rotor.

The apparatus may further comprise a sensing unit and a controlling unit. The sensing unit may be configured to sense a position of the image scanner and to generate signals corresponding to the sensed position. The controlling unit may be configured to receive the signals from the sensing unit.

The apparatus may further comprise a main body configured to support the operating unit. The sensing unit may comprise at least one disc-type encoder and at least one encoder strip. The at least one disc-type encoder may be provided within either one of the operating unit and the main body. The least one encoder strip may be provided within the other one of the operating unit and the main body.

The sensing unit may further comprise a disc-type encoder strip and an encoder sensor. The disc-type encoder strip may be configured to rotate by the driving force transmitted from the power transmitting unit. The encoder sensor may be configured to sense the amount of rotation of the disc-type encoder strip.

The operating unit may comprise a driving pulley, a driven pulley and a scanning carrier. The driving pulley may be configured to be driven by the driving force transmitted from the power transmitting unit. The driven pulley may be connected to the driving pulley through a driving belt. The scanning carrier may be configured to move forward and backward in connection with the driving belt.

According to another aspect of the present disclosure, a scanner may be provided to include a scanning unit, a scanning carrier, a driving belt, a driving pulley, a driven pulley, a first motor, a second motor and a power transmitting unit. The scanning unit may be configured to receive light from a document to be scanned. The scanning carrier may support thereon the scanning unit. The driving belt may be connected to the scanning carrier. The driving pulley and The driven pulley may each support the driving belt in such a manner that the driving belt is rotatable in response to a rotation of the driving pulley. The first and second motors may be configured to generate a first and second driving forces, respectively. The power transmitting unit may be configured to transmit a driving force to the driving pulley while preventing transmission of the driving force between the first and second motors. The driving force may be a select one of the first driving force received from the first motor and the second driving force received from second motor.

The scanner may further comprise a driving gear coupled to the driving pulley in such a manner that the driving gear and the driving pulley are rotatable together. The power transmitting unit may further comprise a first actuator and a second actuator. The first actuator may be coupled to the first swing gear so as to move the first gear selectively to a first position and a second position. The first swing gear may be in engagement with the driving gear when the first swing gear is in the first position. The first swing gear may be spaced apart from the driving gear when the first swing gear is in the second position. The second actuator may be coupled to the second swing gear so as to move the second gear selectively to a third position and a fourth position. The second swing gear may be in engagement with the driving gear when the second swing gear is in the third position. The second swing gear may be spaced apart from the driving gear when the second swing gear is in the fourth position.

The first and second actuators may be configured to move respectively the first swing gear and the second gear along a direction parallel to a rotational axis about which the driving gear rotates.

The scanner may further comprise a sensing unit and a main body configured to support therein the driving pulley and the driven pulley. The sensing unit may comprise at least one disc-type encoder strip and at least one encoder sensor. The at least one disc-type encoder strip may be arranged on at least one of the driving pulley and the driven pulley. The at least one encoder sensor may be arranged on the main body in such a manner capable of sensing the at least one disc-type encoder strip.

The scanner according to an embodiment may further comprise a sensing unit that may include a disc-type encoder strip and an encoder sensor. The disc-type encoder strip may be configured to rotate in response to the driving force transmitted from the power transmitting unit. The encoder sensor may be configured to sense an amount of rotation of the disc-type encoder strip.

According to yet another aspect of the present disclosure, an image scanner for reading an image of a document may be provided to comprise a scanning unit, a scanning carrier, a first motor and a second motor. The scanning unit may be configured to receive an optical information relating to the image of the document. The scanning carrier may support the scanning unit. The first and second motors may each be configured to generate a driving force to move the scanning carrier. Transmission of the driving force between the first motor and the second motor during a movement of the scanning carrier may be prevented.

BRIEF DESCRIPTION OF THE DRAWINGS

Various features and advantages of the disclosure will become more apparent by the following detailed description of several embodiments thereof with reference to the attached drawings, of which.

DETAILED DESCRIPTION OF SEVERAL EMBODIMENTS

Figure 1:
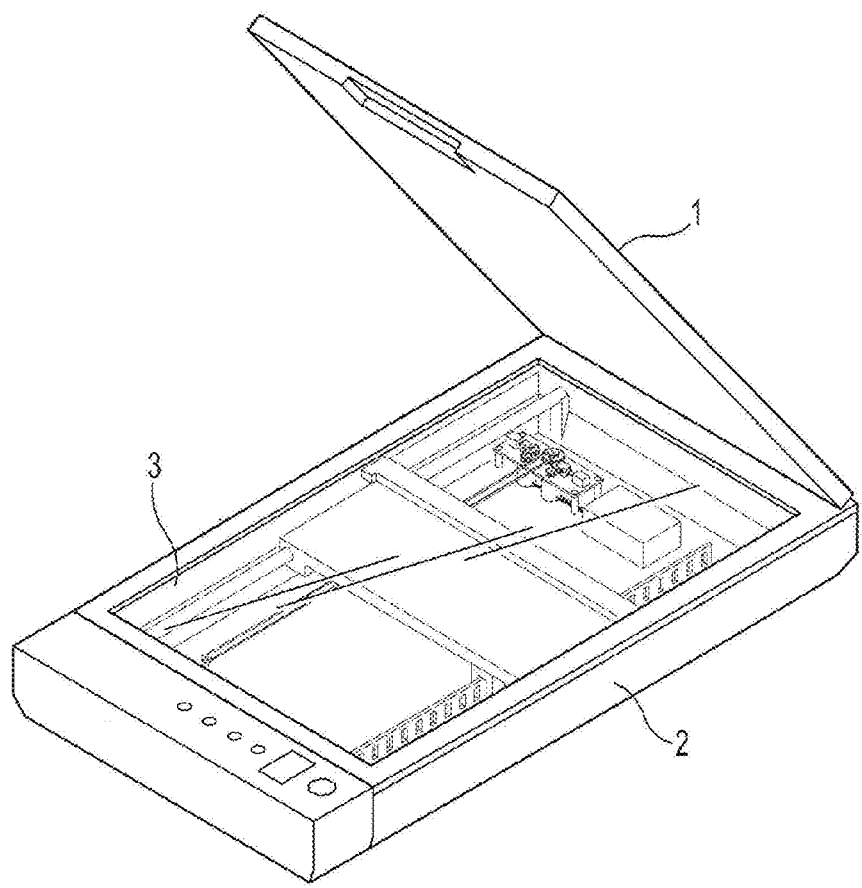
FIG. 1 is a perspective view of a scanner according to an embodiment.

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 2:
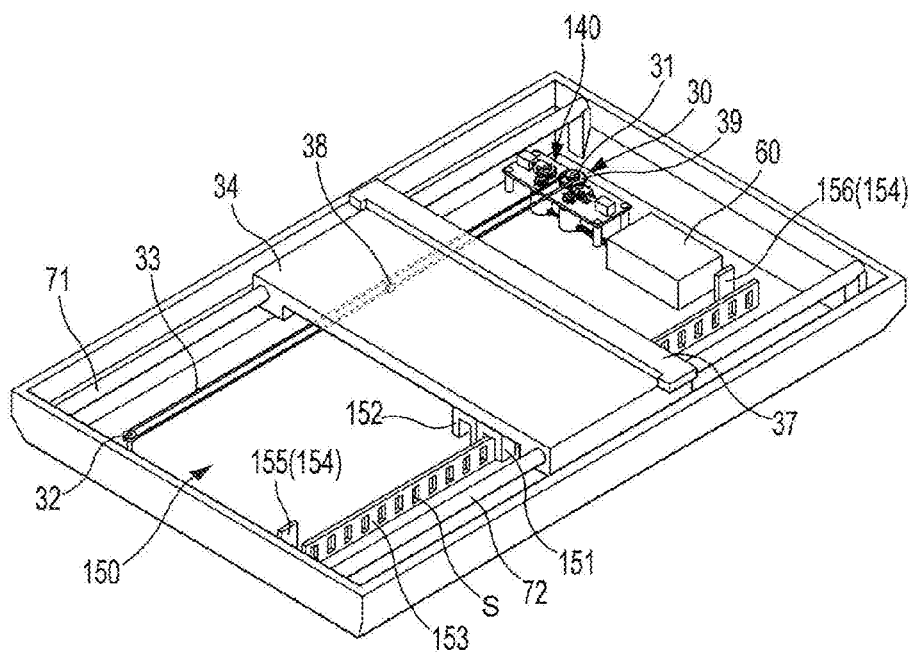
FIG. 2 is a perspective view showing the driving structure of the scanner according to an embodiment.

FIG. 1 is a perspective view of a scanner according to an embodiment. FIG. 2 is a perspective view showing the driving structure of a scanner according to an embodiment.

Referring to FIG. 1, the scanner may include a cover 1 and a main body 2. A scanning window 3 may be mounted at an upper part of the main body 2 for placing a document thereon. Various operational parts for scanning may be provided in the main body 2. The cover 1 may be pivotably mounted to one side of the main body 2 to cover the document being scanned.

Figure 3A:
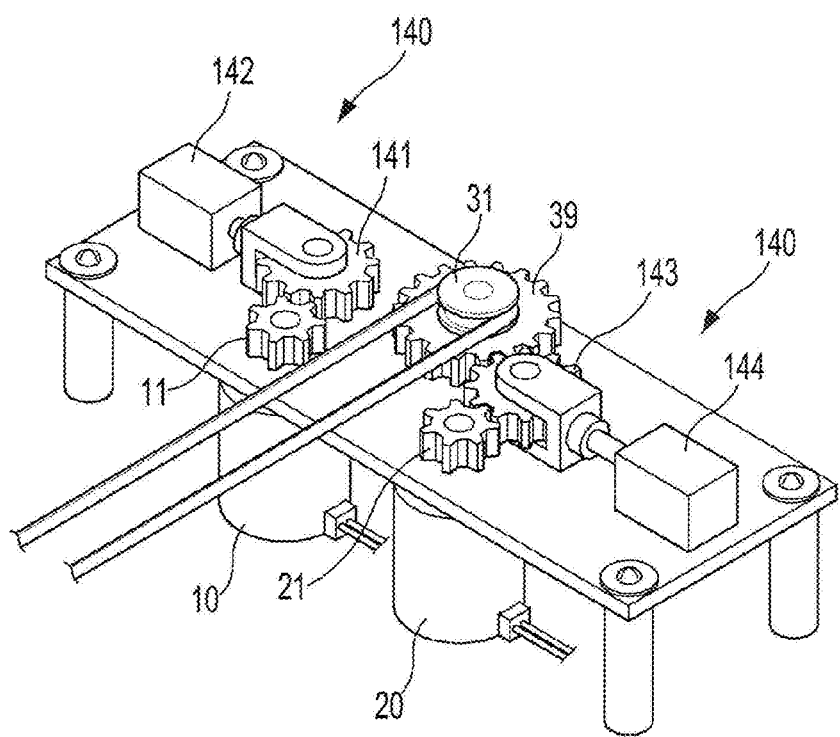
FIG. 3A is a partial enlarged view of a section of the driving structure shown in FIG. 2.

As shown in FIGS. 2 and 3A, the scanner may further comprise a first driving motor 10, a second driving motor 20, an operating unit 30 and a power transmitting unit 140. According to an embodiment, the first driving motor 10 may include a DC motor and the second driving motor 20 may include a step motor.

The operating unit 30 may include a driving pulley 31, a driven pulley 32 connected to the driving pulley 31 through a driving belt 33, and a scanning carrier 34 configured to move forward and backward in connection with the driving belt 33. A fixing member 38 may be configured to fix the scanning carrier 34 and the driving belt 33. A driving gear 39 may, in an embodiment, be integrally formed with the driving pulley 31. Guiding rods 71 and 72 may be configured to guide the forward and backward movement of the scanning carrier 34.

A scanning unit 37 may be mounted to the scanning carrier 34, and may be configured to read image data recorded on the document while being moved forward and backward by the scanning carrier 34. The scanning unit 37 may include a light source (not shown) configured to emit light on the document, as well as an image sensor (not shown) configured to collect the light reflected from the document and to convert the light into electric signals. The image sensor may comprise, for example, a charge coupled device (CCD) or a contact image sensor (CIS) configured to output analog image signals of a predetermined number of pixels according to a set resolution, according to an embodiment.

The operating unit 30 may be operated by the first driving motor 10 and/or the second driving motor 20. According to an embodiment, the scanner may include the power transmitting unit 140 configured to selectively transmit a driving force of the first driving motor or the second driving motor to the operating unit 30.

Figure 3B:
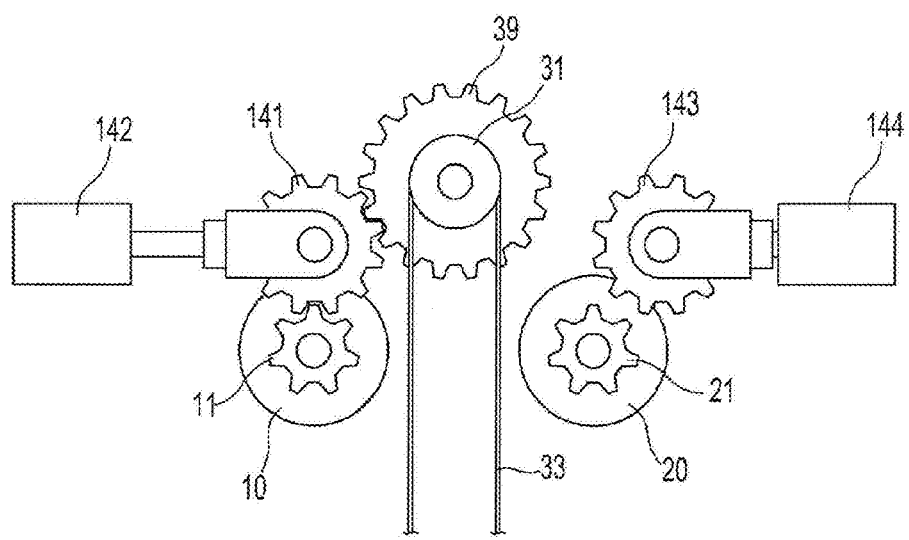
FIG. 3B and FIG. 3C are views illustrating operation of a power transmitting unit of a scanner according to an embodiment.
Figure 3C:
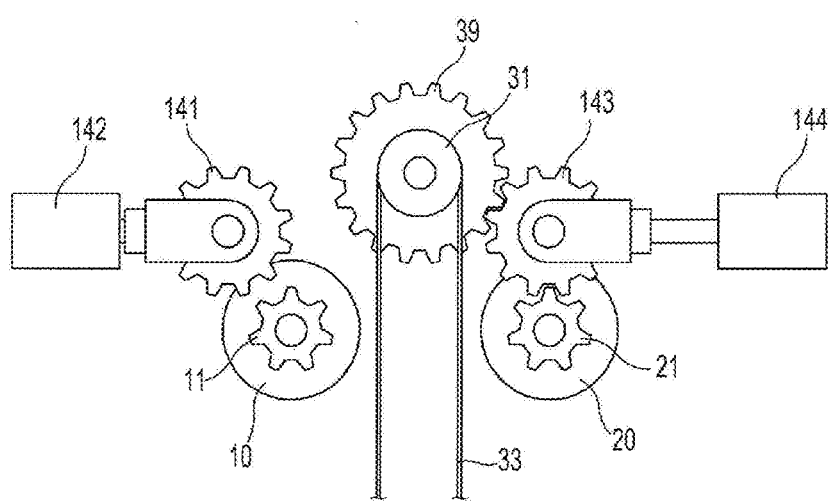

FIG. 3A is an enlarged view of a section of FIG. 2. FIG. 3B and FIG. 3C are views illustrating the operation of the power transmitting unit according to an embodiment.

As shown in FIG. 3A, the power transmitting unit 140 may include a first swing gear 141 that is configured to selectively connect the first driving motor 10 to the operating unit 30 and a second swing gear 143 that is configured to selectively connect the second driving motor 20 to the operating unit 30.

The first swing gear 141 may be moved by a first actuator 142, thereby selectively connecting an output gear 11 of the first driving motor 10 with the driving gear 39 of the driving pulley 31. The second swing gear 143 may be moved by a second actuator 144, thereby selectively connecting an output gear 21 of the second driving motor 20 with the driving gear 39 of the driving pulley 31.

With reference to FIG. 3B, when the first driving motor 10 is driven, the first swing gear 141 is moved by the first actuator 142, and is engaged with the output gear 11 of the first driving motor 10 and the driving gear 39 of the driving pulley 31. The driving force of the first driving motor 10 is transmitted to the driving belt 33 through the output gear 11, the first swing gear 141, the driving gear 39 and the driving pulley 31, thereby moving the scanning carrier 34 forward and backward.

With reference to FIG. 3C, when the second driving motor 20 is driven, the second swing gear 143 is moved by the second actuator 144, and is engaged with the output gear 21 of the second driving motor 20 and the driving gear 39 of the driving pulley 31. The driving force of the second driving motor 20 is transmitted to the driving belt 33 through the output gear 21 of the second driving motor 20, the second swing gear 143, the driving gear 39 and the driving pulley 31, thereby enabling the forward and backward movement of the scanning carrier 34.

Thus, the first driving motor 10 and the second driving motor 20 of the scanner, according to an embodiment, may be driven selectively in accordance with the desired resolution, scanning speed, and other considerations. For example, if a fast operation of the scanning carrier 34 is required for high-speed scanning, the first driving motor 10 comprising a DC motor may be driven. On the other hand, if a precision operation of the scanning carrier 34 is required for high-resolution scanning, the second driving motor 20 comprising a step motor may be driven. Thus, the driving motor may be selected according to a desired speed, for example.

In addition, according to an embodiment, transmission of the driving force from one of the first and the second driving motors 10 and 20 to the other one may be prevented by the first swing gear 141 and the second swing gear 143. When the first driving motor 10 is driven, the first swing gear 141 is engaged with the output gear 11 of the first driving motor 10 and the driving gear 39 whereas the second swing gear 143 is separated from the output gear 21 of the second driving motor 20 and the driving gear 39. Therefore, the driving force of the first driving motor 10 is not transmitted to the second driving motor 20. As a result, the second driving motor 20 will not be unnecessarily operated, thereby reducing the likelihood of the loss of power and/or the increase in the noise and vibration. Analogously, when the second driving motor 20 is driven, the driving force is not transmitted to the first driving motor 10, reducing the likelihood of the loss of power and/or the increased noise and vibration due to the first driving motor 10.

With reference again to FIG. 2, the scanner may further include a sensing unit 150 that may be configured to detect the position and moving speed of the scanning carrier 34. According to an embodiment, a controlling unit 60 configured to receive signals generated from the sensing unit 150 may also be incorporated in the scanner.

The sensing unit 150 may include first and second encoder sensors 151 and 152 provided on the scanning carrier 34 of the operating unit 30, as well as first and second encoder strips 153 and 154 provided within the main body 2. The first encoder sensor 151 may be configured to detect a slit 's' formed at the first encoder strip 153, and accordingly may be able to generate signals corresponding to the position and the speed of the scanning carrier 34. The second encoder sensor 152 may be configured to detect a first portion 155 and a second portion 156 of the second encoder strip 154, and may accordingly generate signals corresponding to a starting point and an ending point of the operation of the scanning carrier 34.

The controlling unit 60 may be configured to control the first driving motor 10 and/or the second driving motor 20 based on the signals generated from the first encoder sensor 151 and/or the second encoder sensor 152. According to an embodiment, the second driving motor 20 may be a step motor where a rotational angle of a rotational shaft is determined in proportion to the number of input pulse signals. Accordingly, the scanner may be capable of more precise controlling of the step motor through the sensing unit 150. More specifically, although an error by gear tolerances and step-out of the step motor may occur during the operation of the step motor, the sensing unit 150, according to an embodiment, may be capable of compensating for the error and preventing the step-out.

Figure 4A:
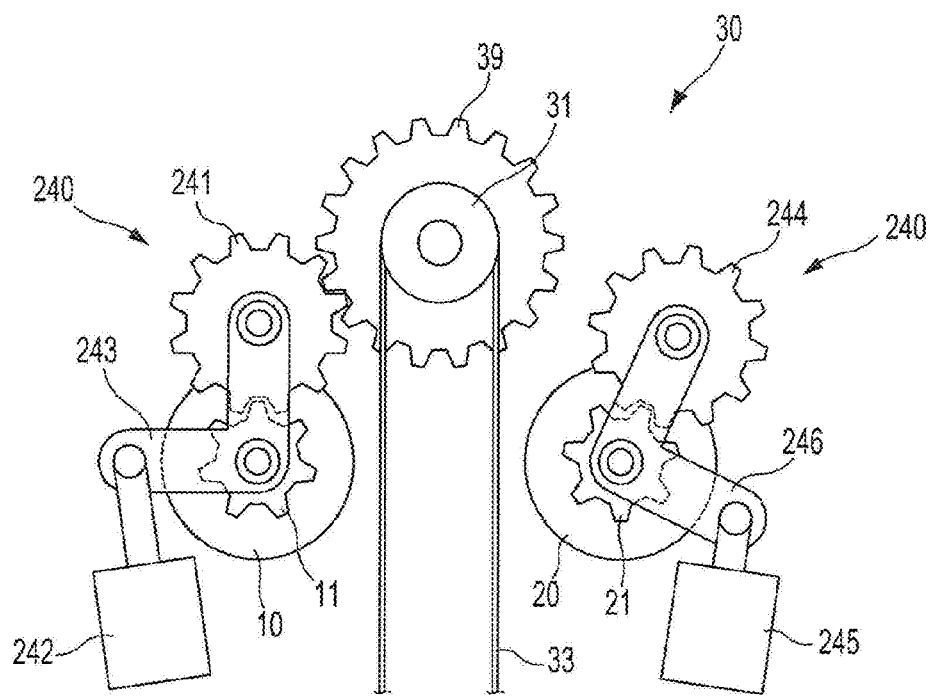
FIG. 4A and FIG. 4B are views illustrating operation of a power transmitting unit of a scanner according to another embodiment.
Figure 4B:
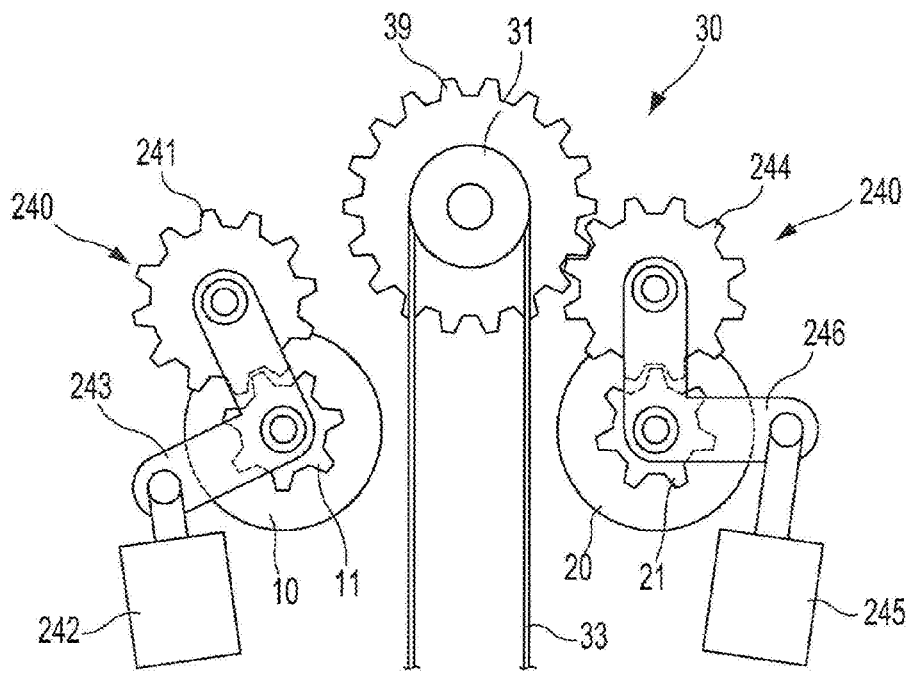

FIG. 4A and FIG. 4B are views illustrating the operation of a power transmitting unit of a scanner according to another embodiment.

A power transmitting unit 240 may comprise a first swing gear 241 configured to selectively connect the first driving motor 10 to the operating unit 30 and a second swing gear 244 configured to selectively connect the second driving motor 20 to the operating unit 30. The first swing gear 241 and the second swing gear 244 may respectively be connected to a first lever 243 and a second lever 246, which may be coaxially connected with the rotational shaft of the output gear 11 of the first driving motor 10 and the rotational shaft of the output gear 21 of the second driving motor 20, respectively. The first lever 243 and the second lever 246 may be configured to pivot under the control of a first actuator 242 and a second actuator 245, respectively. The first and the second levers 243 and 246 may be configured not to interfere with rotations of the output gear 11 of the first driving motor 10 and the output gear 21 of the second driving motor 20 when pivoting.

The driving structure of the swing gears 241 and 244 as described above is only by way of example. The swing gears 241 and 244 may be operated with other various structures.

Figure 5:
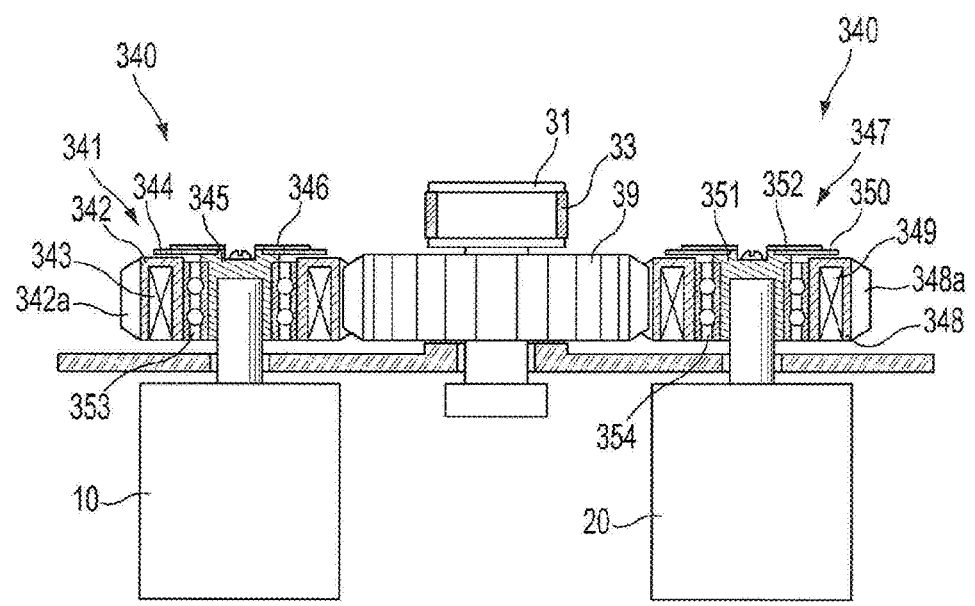
FIG. 5 is a view illustrating operation of a power transmitting unit of a scanner according to yet another embodiment.

FIG. 5 is a view illustrating the operation of a power transmitting unit of a scanner according to an embodiment.

The power transmitting unit 340 may include a first electro-magnetic clutch 341 configured to connect the first driving motor 10 with the operating unit 30 and a second electro-magnetic clutch 347 configured to connect the second driving motor 20 with the operating unit 30. Transmission of the driving force to the operating unit 30 through the first and the second electro-magnetic clutches 341 and 347 may be controlled according to the on and off states of the electro-magnetic clutches 341 and 347. Thus, power transmission between the first driving motor 10 and the second driving motor 20 may be selectively interrupted.

The electro-magnetic clutches 341 and 347 may respectively comprise rotors 342 and 348 including built-in coils 343 and 349, armatures 344 and 350 facing the rotors 342 and 348, hubs 345 and 352 connected with the armatures 344 and 350, and leaf springs 346 and 351. The leaf springs 346 and 351 may be fixed to the hubs 345 and 352 by one end thereof and may be fixed to the armatures 344 and 350 by the other end, respectively, thereby supplying elasticity to the armatures 344 and 350 in a direction opposite that of the rotors 342 and 348. Bearings 353 and 354 may also be included in the electro-magnetic clutches 341 and 347, respectively.

According to the above structure, when power is applied to the coils 343 and 349 of the rotors 342 and 348, the armatures 344 and 350 may be brought into close contact with the rotors 342 and 348 against the elasticity of the leaf springs 346 and 351. When the driving motors 10 and 20 generate the rotational force upon application of power, the rotational force of the driving motors 10 and 20 may be transmitted to the driving gear 39 through the hubs 345 and 352, the armatures 344 and 350, and the rotors 342 and 348. Tooth profiles 342a and 348a may be formed on outer circumferences of the rotors 342 and 348, respectively, to be engaged with the driving gear 39.

When the power application to the coils 343 and 349 is interrupted, the armatures 344 and 350 may be separated from the rotors 342 and 348 by the leaf springs 346 and 351. Accordingly, respective power transmission between the rotors 342 and 348 and the armatures 344 and 350 may be interrupted.

Figure 6:
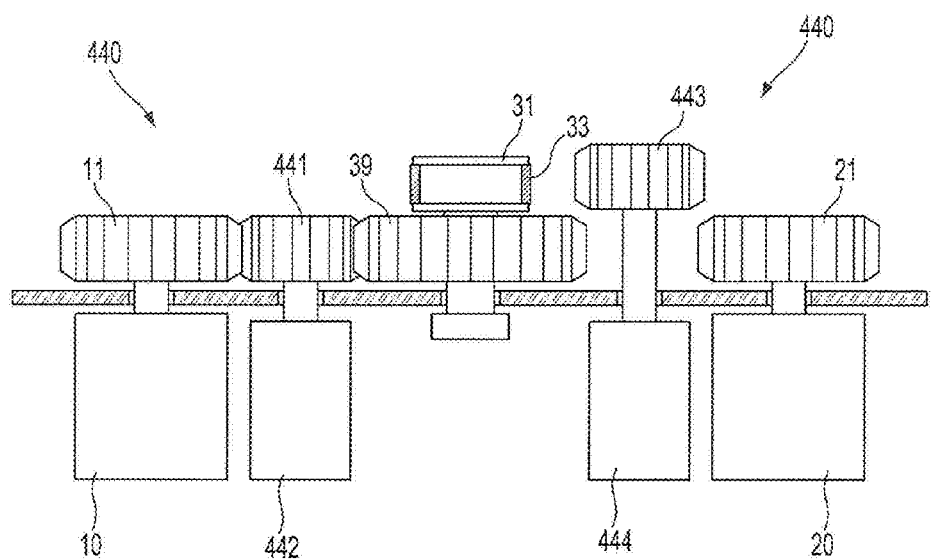
FIG. 6 is a view illustrating operation of a power transmitting unit of a scanner according to a further embodiment.

FIG. 6 is a view illustrating the operation of a power transmitting unit of a scanner according to another embodiment.

The power transmitting unit 440 according to an embodiment may include a first connection gear 441 selectively connecting the first driving motor 10 with the operating unit 30 and a second connection gear 443 selectively connecting the second driving motor 20 with the operating unit 30. The first connection gear 441 may be moved up and down by a first linear motor 442, thereby connecting and disconnecting the first driving motor 10 with respect to the operating unit 30. The second connection gear 443 may be moved up and down by a second linear motor 444, thereby connecting and disconnecting the second driving motor 20 with respect to the operating unit 30.

Figure 7:
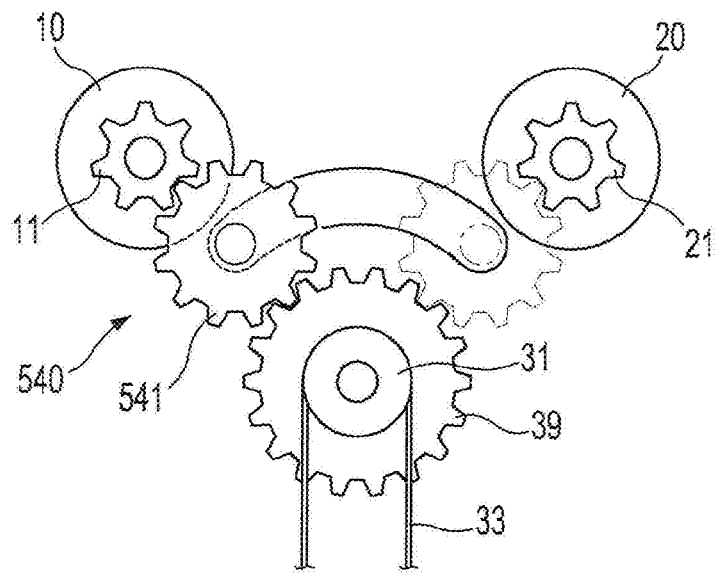
FIG. 7 is a view showing a power transmitting unit of a scanner according to an embodiment.

FIG. 7 is a view showing a power transmitting unit of a scanner according to another embodiment.

The power transmitting unit 540, according to an embodiment, may include a swing gear 541 that is configured to selectively connect the operating unit 30 with the first and/or the second driving motors 10 and 20. A driving shaft of the swing gear 541 may be configured to move around the driving gear 39 by a dedicated moving device (not shown).

Figure 8:
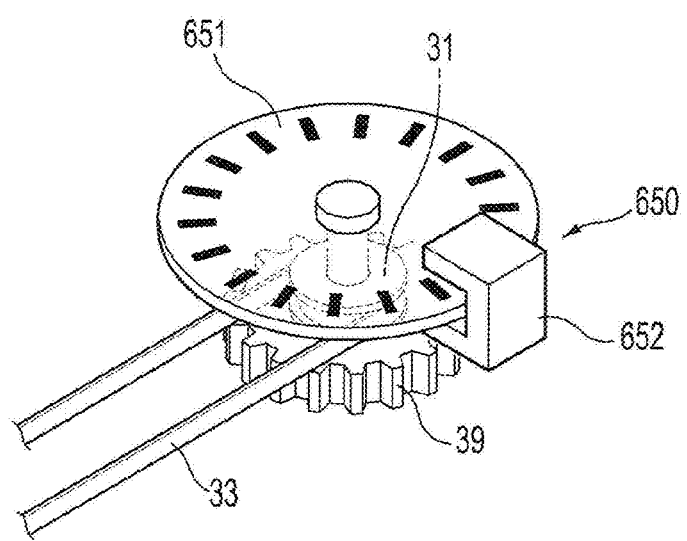
FIG. 8 is a view showing a sensing unit of a scanner according to a further embodiment.

FIG. 8 is a view showing a sensing unit of a scanner according to an embodiment.

The sensing unit 650 may include a disc-type encoder strip 651 fixedly connected to the driving pulley 31 configured to be rotated by the driving force transmitted from a power transmitting unit and a disc-type encoder sensor 652 configured to sense an amount of rotation of the disc-type encoder strip 651. The disc-type encoder sensor 652 may be configured to transmit signals corresponding to the rotation amount of the driving pulley 31 to the controlling unit 60. The controlling unit 60, based on the signals, may be configured to calculate the position and the speed of the scanning carrier 34.

The scanner has been described herein merely as an example of the type of devices for which various embodiments of a driving structure disclosed herein. The driving structure according to the embodiments may be applied to other products in addition to the scanner.

Also, although the first driving motor includes the DC motor and the second driving motor includes the step motor in the described embodiments, the first and the second driving motors may be both DC motors or both step motors. Other types of motors may also be utilized.

Alternatively, at least one encoder sensor may be provided with the main body while at least one encoder strip detected by the encoder sensor may be provided with the scanning carrier. Other types of sensors may be adopted to detect information related to the position and/or the speed of the scanning carrier.

Furthermore, combined use of the power transmitting units of the above embodiments is possible. For example, the scanner according to an embodiment may be structured so that power transmission between the first driving motor and the operating unit is achieved by the swing gear whereas power transmission between the second driving motor and the operating unit is achieved by the electro-magnetic clutch.

Although the operating unit described herein includes a pair of pulleys and a driving belt, this is only by way of example; various other configurations are applicable to the operating unit. For example, the operating unit may include a rack gear connected to the scanning carrier and a spur gear connected to the main body and meshed with the rack gear.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. An apparatus for driving a movement of an image scanner, comprising: a first motor configured to generate a first driving force; a second motor configured to generate a second driving force; an operating unit configured to receive a driving force and to be operably coupled to the image scanner so as to cause the movement of the image scanner in response to the received driving force; and a power transmitting unit configured to transmit the driving force to the operating unit while preventing transmission of the driving force between the first and second motors, the driving force being one of the first driving force received from the first motor and the second driving force received from second motor.

2. The apparatus according to claim 1, wherein the first motor comprises a DC motor, the second motor comprising a step motor.

3. The apparatus according to claim 1, wherein the power transmitting unit comprises at least one swing gear each configured to selectively couple the operating unit to a respective corresponding one of at least one of the first motor and the second motor.

4. The apparatus according to claim 3, wherein the at least one swing gear comprises: a first swing gear configured to selectively couple the first motor to the operating unit; and a second swing gear configured to selectively couple the second motor to the operating unit.

5. The apparatus according to claim 1, wherein the power transmitting unit comprises at least one electro-magnetic clutch each configured to selectively couple the operating unit to a respective corresponding one of the first and second motors, and wherein transmission of the driving force is selectively allowed according to on and off states of the at least one electro-magnetic clutch.

6. The apparatus according to claim 5, wherein the electro-magnetic clutch comprises: a rotor comprising a coil; an armature mounted to face the rotor; a hub connected with the armature; and a leaf spring having one end thereof fixed to the hub and the other end thereof fixed to the armature, wherein the leaf spring is configured to elastically bias the armature away from the rotor.

7. The apparatus according to claim 1, further comprising: a sensing unit configured to sense a position of the image scanner and to generate signals corresponding to the sensed position; and a controlling unit configured to receive the signals from the sensing unit.

8. The apparatus according to claim 7, wherein the sensing unit further comprises: a disc-type encoder strip configured to rotate by the driving force transmitted from the power transmitting unit; and an encoder sensor configured to sense an amount of rotation of the disc-type encoder strip.

9. The apparatus according to claim 1, wherein the operating unit comprises: a driving pulley configured to be driven by the driving force transmitted from the power transmitting unit; a driven pulley connected to the driving pulley through a driving belt; and a scanning carrier configured to move forward and backward in connection with the driving belt.

10. A scanner, comprising: a scanning unit configured to receive light from a document to be scanned; a scanning carrier supporting thereon the scanning unit; a driving belt connected to the scanning carrier; a driving pulley and a driven pulley each supporting the driving belt in such a manner that the driving belt is rotatable in response to a rotation of the driving pulley; first and second motors configured to generate a first and second driving forces, respectively; and a power transmitting unit configured to transmit a driving force to the driving pulley while preventing transmission of the driving force between the first and second motors, the driving force being one of the first driving force received from the first motor and the second driving force received from second motor.

11. The scanner according to claim 10, wherein the first motor comprises a DC motor, the second motor comprising a step motor.

12. The scanner according to claim 10, wherein the power transmitting unit comprises: a first swing gear configured to selectively couple the first motor to the driving pulley; and a second swing gear configured to selectively couple the second motor to the driving pulley.

13. The scanner according to 12, further comprising: a driving gear coupled to the driving pulley in such a manner that the driving gear and the driving pulley are rotatable together, wherein the power transmitting unit further comprises: a first actuator coupled to the first swing gear so as to move the first gear selectively to a first position and a second position, the first swing gear being in engagement with the driving gear when the first swing gear is in the first position, the first swing gear being spaced apart from the driving gear when the first swing gear is in the second position; and a second actuator coupled to the second swing gear so as to move the second gear selectively to a third position and a fourth position, the second swing gear being in engagement with the driving gear when the second swing gear is in the third position, the second swing gear being spaced apart from the driving gear when the second swing gear is in the fourth position.

14. The scanner according to claim 13, wherein the first and second actuators are configured to move respectively the first swing gear and the second gear along a direction parallel to a rotational axis about which the driving gear rotates.

15. The scanner according to claim 10, wherein the power transmitting unit comprises at least one electro-magnetic clutch each configured to selectively couple the driving pulley to a respective corresponding one of the first and second motors, and wherein transmission of the driving force is selectively allowed according to on and off states of the at least one electro-magnetic clutch.

16. The scanner according to claim 10, further comprising: a sensing unit configured to sense a position of the image scanner and to generate signals corresponding to the sensed position; and a controlling unit configured to receive the signals from the sensing unit.

17. The scanner according to claim 16, wherein the sensing unit further comprises: a disc-type encoder strip configured to rotate in response to the driving force transmitted from the power transmitting unit; and an encoder sensor configured to sense an amount of rotation of the disc-type encoder strip.

* * * * *